Nov. 8, 1938.    K. G. ÖSTBERG    2,135,911

SHEARING OR CUTTING TOOL

Filed Dec. 30, 1936

K. G. Östberg
Inventor

By: Glascock Downing & Seebold
Attys.

Patented Nov. 8, 1938

2,135,911

UNITED STATES PATENT OFFICE 2,135,911

SHEARING OR CUTTING TOOL

Karl Gustaf Östberg, Stockholm, Sweden, assignor to Fabriksaktiebolaget Haldataxametern, Halmstad, Sweden, a company of Sweden Application December 30, 1936, Serial No. 118,356
In Sweden February 12, 1936

7 Claims. (Cl. 164—41)

My invention relates to tools or machines for shearing or cutting metal plate, other sheet material or wire. More particularly my invention relates to shearing tools comprising two cutting blades or jaws which are movable in relation to each other in the cutting plane.

It is an object of my invention to provide a tool of the above mentioned kind by means of which not only straight cuts but also arcuate cuts and cuts curved in other manner can be readily made even when the radius of bend of the cut is relatively very small.

My novel tool can be designed either as a hand tool or as a power-driven shearing or cutting machine. In the first mentioned case one of the two cutting blades, which are pivoted together, is preferably adapted to be rigidly secured at the underside of its free end in a bench-vise or the like while the other cutting blade is provided at its corresponding end with a handle. The upper surface of the stationary cutting blade can form a substantially horizontal support or table for the work piece, providing a guide for the latter.

The invention will now be described more in detail having reference to the drawing annexed to this specification and forming part thereof which shows by way of example an embodiment of my invention.

Figure 1:
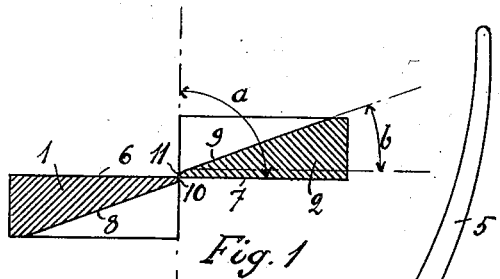
Figure 1 is a vertical section through the two cutting blades on the line 1—1 in Figure 2.
Figure 2:
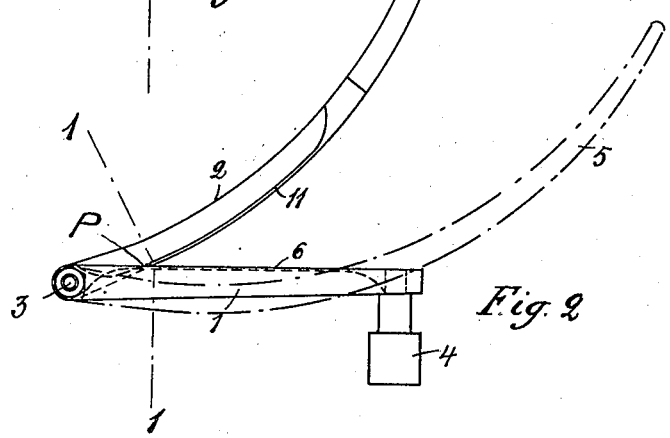
Figure 2 is a side view.
Figure 3:
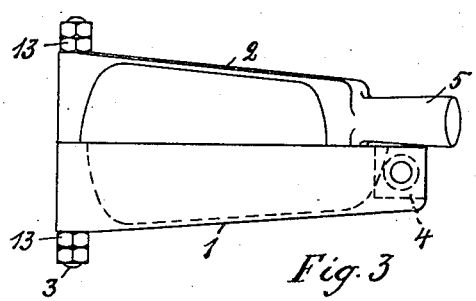
Figure 3 is a plan view.
Figure 4:
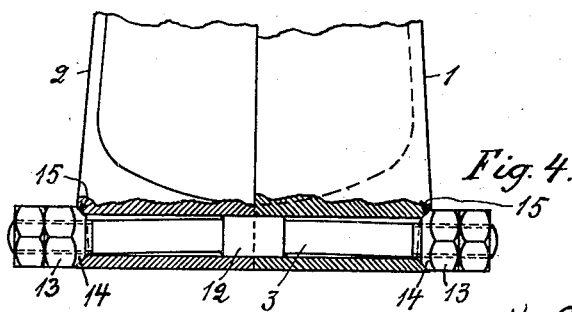
Figure 4 is a detail showing on a larger scale and partly in section the manner of pivoting the cutting blades together.

In the embodiment illustrated in the drawing the two cutting blades 1 and 2 are pivoted together at one end by means of a bolt 3. At the end of the cutting blade 1 remote from the pivot 3 there is provided at the underside of the blade a fastening in the shape of a square 4 provided with a pin-shaped extension by means of which it is riveted or secured in other manner to the cutting blade. Said fastening 4 is intended for fixing the shearing machine in a bench-vise or the like. The other cutting blade 2 is of arcuate shape and provided at its free end with a handle 5. The arcuate-shape of one of the cutting blades insures that the angle between the two cooperating cutting edges will remain approximately constant during the entire cutting stroke whereby the cutting work is facilitated. The upper side 6 of the stationary cutting blade 1 is plane and is substantially horizontal when the shears or shearing machine is mounted for operation, said upper side 6 then forming a table or guiding support for the piece of work. The underside 7 of the other cutting blade 2 forms a curved surface having a rectilinear generatrix. The cutting blades 1 and 2 have at their ends approximately rectangular cross sections but the cutting portions of the blades taper in cross section in a direction towards the cutting plane, or, in other words, the cutting portions of the blades are approximately wedge-shaped in cross-section with the pointed edges 10 and 11 of the wedges in the cutting plane. The opposed cooperating thin edges 10 and 11 of the respective wedges cross each other approximately in a point P at which the shearing is effected, as will be clear from Figure 2. The edge 10 is somewhat rounded off on its lower side and the edge 11 somewhat rounded off on its upper side. In the shown example the cutting angle $a$ (Figure 1) is 90° but it can, if desired, be made smaller in which case the surfaces 6 and 7 will form angles with each other. The wedge angle $b$ can, for example, be made equal to 20°.

The bolt 3, which holds together the cutting blades 1 and 2 and which serves at the same time as a pivot, is provided intermediate its ends with an enlarged portion 12 fitting into a corresponding bore in the cutting blades, but the other parts of the bolt have a reduced diameter which is smaller than the diameter of the bore. The nuts 13 threaded onto the ends of the bolt 3 are provided with conical bearing surfaces 14 resting in corresponding conical recesses 15 at the mouths of the bore in the cutting blades, said recesses being eccentrical in relation to the bore in such a manner that upon tightening of the nuts 13 the ends of the bolt are bent backwards so as to act as powerful springs through which the blades are held pressed against each other.

When working a metal plate, for instance, the plate is successively moved forward on the horizontal upper side 6 of the blade 1 serving as a support. The cut is formed by depressing the cutting blade 2 by means of the handle 5. During the shearing operation the portion of the plate to the right of the cut will bear against the underside 7 of the movable cutting blade whereas the portion of the plate to the left of the cut will rest on the horizontal surface 6 of the stationary blade. If the score line along which the cut is to be made is a curved line the plate can be turned correspondingly about the crossing point P of the cutting edges 10, 11 without obstruction even when the radius of bend is very small.

When the plate is turned in one direction the portion of the plate to the left of the cut, which portion is normally supported by the plane surface 6, will slide up on the slanting upper side of the cutting blade 2, and when turning the plate in the other direction the portion of the plate to the right of the cut, which portion is normally below the surface 7, will slide in under the slanting underside 8 of the cutting blade 1. In this manner cuts having an almost arbitrary great curvature can be made, in that the plate can be turned almost arbitrarily in its own plane about the crossing point P as a centre. Even very large pieces of plate can be sheared without difficulty by one man when using the shearing tool described.

The invention can be modified in many different ways. The cutting blades 1 and 2 need not necessarily be turnable mutually but can have a rectilinear movement in respect to each other. If desired, both cutting blades can be straight or both be curved. The shearing tool can, if desired, be power-driven. On the other hand, instead of being adapted to be screwed into a bench-vise or the like it can be designed as a hand tool having two handles. Also other modifications can be made within the scope of the invention. For example, the shearing device can be mounted in a separate and preferably displaceable holder or slide or the like in which the fastening 4 is mounted, so that during operation the whole tool can be moved on a horizontal support.

I claim:

1. A tool for shearing or cutting metal plates or the like comprising in combination a first shearing blade, a second shearing blade, pivot means for connecting together said first shearing blade and said second shearing blade at an extreme end of each blade for relative movement of the blades in a common shearing plane, said first and said second shearing blades having in cross section the shape of a narrow wedge pointing towards the common shearing plane, a handle at the free end of said first shearing blade, and supporting means at the free end of said second shearing blade, the upper side of said second shearing blade being plane without obstructions and forming a support for the plate to be sheared.

2. A tool according to claim 1, wherein the supporting means at the free end of said second shearing blade consists of a foot or slide which is movable on a horizontal table.

3. A tool according to claim 1, wherein the supporting means at the free end of said second shearing blade consists of a projection for securing the tool in a bench-vise or the like.

4. A tool for shearing or cutting metal plates or the like comprising in combination a first shearing blade, a second shearing blade, a common pivot bolt connecting together said first and said second shearing blades at an extreme end of each blade for relative movement of the blades in a common shearing plane, said first and said second shearing blades having a flattened cross section the greater linear dimension of which extends in a direction substantially perpendicular to said common shearing plane, the shearing portions of said blades tapering towards said plane.

5. A tool according to claim 4, wherein the pivot bolt extends over the whole width of the flattened shearing blades.

6. A tool for shearing or cutting metal plates or the like comprising in combination a first shearing blade, a second shearing blade, an elastic pivot bolt for connecting together said first and said second shearing blades at an extreme end of each blade for relative movement in a common cutting plane, said first and said second shearing blades having a flattened cross section the greater linear measure of which extends in a direction which is substantially perpendicular to said common cutting plane, and means for elastically bending said pivot bolt in such direction that said bolt will act in a manner of a powerful spring to press said first and said second shearing blades together.

7. A tool according to claim 6, wherein said pivot bolt has intermediate its ends an enlarged diameter fitting into a corresponding bore in the pair of shearing blades whereas for the rest said pivot bolt has a smaller diameter than the bore, the mouths of said bore being provided with excentric recesses for the bolt nuts.

KARL GUSTAF ÖSTBERG.